(12) United States Patent
Lorenz et al.

(10) Patent No.: US 6,786,504 B2
(45) Date of Patent: Sep. 7, 2004

(54) GAS BAG RESTRAINING DEVICE

(75) Inventors: Christian Lorenz, Leidersbach (DE);
Udo Bieber, Niedernberg (DE);
John-Oliver Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 153 days.

(21) Appl. No.: 10/035,767

(22) Filed: Dec. 26, 2001

(65) Prior Publication Data
US 2002/0084631 A1 Jul. 4, 2002

(30) Foreign Application Priority Data
Dec. 28, 2000 (DE) .................... 200 22 019 U

(51) Int. Cl.[7] .............................. B60R 21/16
(52) U.S. Cl. .................. 280/728.2; 280/728.3
(58) Field of Search .............. 280/728.2, 728.3

(56) References Cited

U.S. PATENT DOCUMENTS

| 3,887,214 A | * | 6/1975 | Brawn ...................... 280/730.1 |
| 4,828,286 A | | 5/1989 | Fohl |
| 6,042,139 A | * | 3/2000 | Knox ....................... 280/728.3 |
| 6,042,147 A | * | 3/2000 | Nishijima et al. ........ 280/743.1 |
| 6,517,100 B2 | * | 2/2003 | Frisch ...................... 280/728.2 |
| 6,550,804 B2 | * | 4/2003 | Burdock .................... 280/731 |
| 6,561,538 B2 | * | 5/2003 | Ford et al. ............... 280/728.2 |
| 6,588,798 B2 | * | 7/2003 | Bohn et al. .............. 280/743.1 |
| 6,595,549 B2 | * | 7/2003 | Bohn et al. .............. 280/743.1 |
| 2001/0042978 A1 | | 11/2001 | Frisch |
| 2001/0042979 A1 | | 11/2001 | Frisch |
| 2001/0052691 A1 | | 12/2001 | Bieber et al. |
| 2002/0030355 A1 | | 3/2002 | Braunschadel |
| 2002/0084638 A1 | * | 7/2002 | Neupert .................... 280/743.1 |

FOREIGN PATENT DOCUMENTS

| DE | 3630685 | | 2/1988 |
| DE | 19749914 | * | 5/1999 |
| DE | 20010726 | | 10/2000 |
| JP | 10119683 | | 5/1998 |
| WO | WO 97/34783 | * | 9/1997 |

* cited by examiner

Primary Examiner—Peter C. English
Assistant Examiner—Toan To
(74) Attorney, Agent, or Firm—Tarolli, Sundheim, Covell & Tummino L.L.P.

(57) ABSTRACT

The invention relates to a gas bag restraining device comprising a gas bag module which has a gas bag with a front wall upon which an occupant to be restrained can impact in a case of restraint. The front wall has a depression which is produced in that a center portion of the front wall is attached to the module and is prevented from moving when the gas bag is inflated. The gas bag restraining device further comprises a module cover closing a ring-shaped outlet opening of the gas bag module. The module cover has a central hole which is covered by a cap which is stationary during opening of said gas bag module. The module cover has an edge defining the central hole and opens, preferably tears, towards outside starting from the edge. A holding connection is provided between the edge and the cap which is released when said gas bag module is opened.

15 Claims, 3 Drawing Sheets

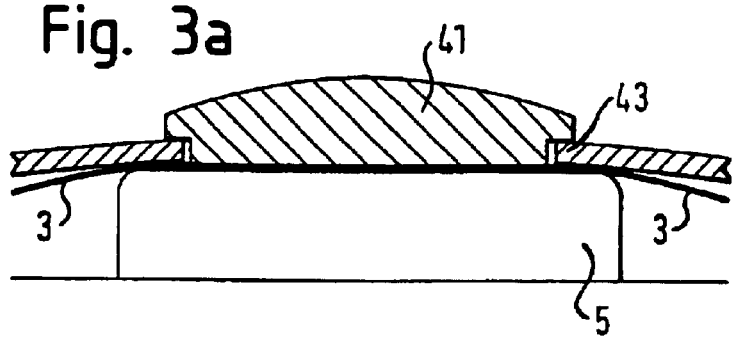
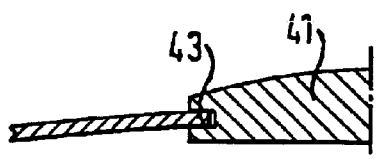
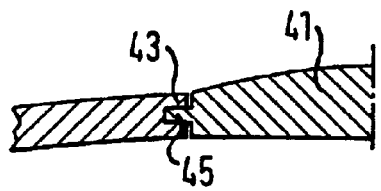
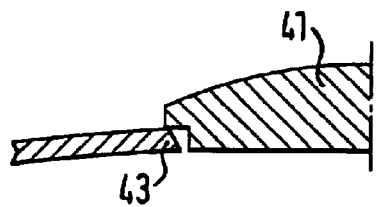
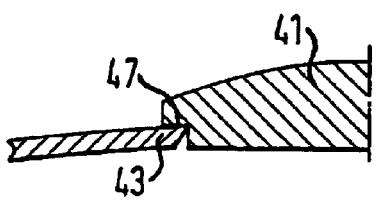
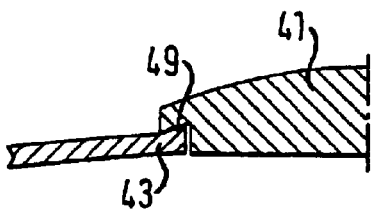
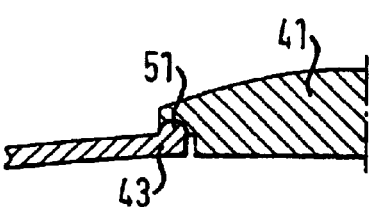

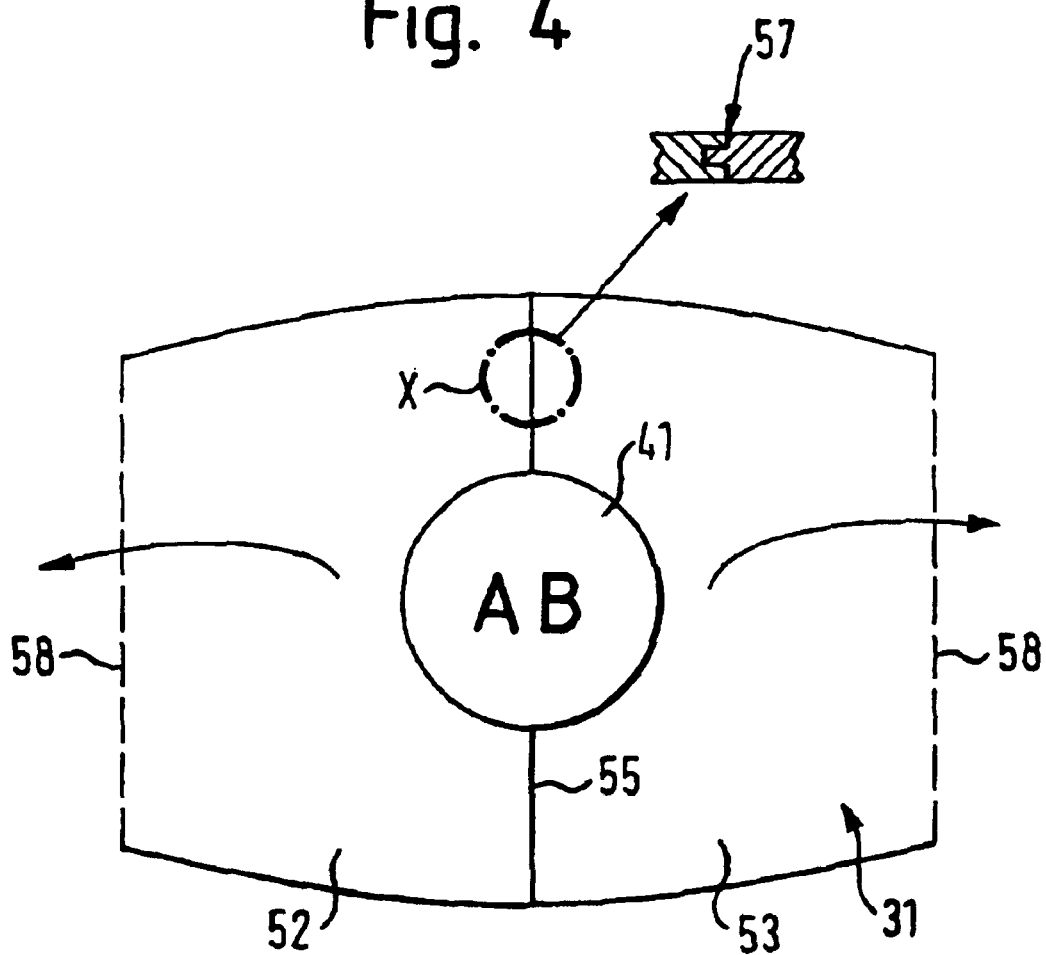

GAS BAG RESTRAINING DEVICE

TECHNICAL FIELD

This invention relates to a gas bag restraing device.

BACKGROUND OF THE INVENTION

Known gas bag restraining devices comprise a gas bag module which has a gas bag with a front wall which an occupant to be restrained can impact upon in a case of restraint, the front wall having a depression which is produced in that a center portion of the front wall is attached to the module and is prevented from free movement, preferably from any movement, when the gas bag is inflated, the gas bag restraining device further comprising a module cover closing a ring-shaped outlet opening of the gas bag module, the module cover having a central hole which is covered by a cap which is stationary during an opening process.

Such a gas bag restraining device is known from DE 197 49 914 A1. This device has a gas bag cover which in the region of the edge of the central hole is firmly attached to the module, to be more precise to a rigid guiding sleeve, and also remains attached thereto when the cover is opened. The module cover has two ring-shaped flap portions, one ring being disposed radially inside the other ring and both rings being formed by segments adjoining each other in peripheral direction. The cover tears between the adjoining rings, the segments of the inner ring swiveling towards outside and the segments of the outer ring inwards and towards each other. Then, the segments of the inner ring are only retained at the gas bag module by means of the guiding sleeve. Opening the cover should possibly always be effected with little and exactly predeterminable force. In the known restraining device, however, this is hardly possible.

BRIEF SUMMARY OF THE INVENTION

The invention provides a gas bag restraining device in which the cover can be opened by the gas bag with a small and relatively exactly predeterminable force.

This is achieved in a gas bag restraining device which comprises a gas bag module which has a gas bag with a front wall upon which an occupant to be restrained can impact in a case of restraint. The front wall has a depression which is produced in that a center portion of the front wall is attached to the module and is prevented from free movement, preferably from any movement, when the gas bag is inflated. The gas bag restraining device further comprises a module cover closing a ring-shaped outlet opening of the gas bag module. The module cover has a central hole which is covered by a cap which is stationary during opening of said gas bag module. The module cover has an edge defining the central hole and opens, preferably tears, towards outside starting from the edge. A holding connection is provided between the edge and the cap which is released when said module is opened. Preferably, the holding connection is a positive, i.e. form fitting, connection. When the module cover bursts, it does not partly remain in the region of the cap, but owing to a releasable holding connection it is able to tear radially from the inside towards outside and radially swings from the inside towards outside which is possible with distinctly less effort than in the case of a closed ring-shaped tear line. The opening behavior of the module cover can thus be improved.

Preferably, the cap makes a tongue-and-groove joint with the edge, so that on the one hand, the edge of the cover cannot be seen from the outside. On the other hand, the cover cannot be levered open in the region of the edge, as the edge is not accessible.

In accordance with an alternative embodiment, the edge is clamped between an underside of the cap and a part of the module to which the cap is attached. This part of the module is, for instance, the gas generator or a diffuser surrounding the gas generator.

The module cover may consist of opposing flap portions having a parting joint where these flap portions are positively connected with each other. Thus, the flap portions are separate portions which already before opening of the cover are two distinct parts, but which owing to the positive connection cannot easily be opened from the outside.

Another embodiment makes provision that the module cover has an end wall and a side wall, the end wall being clamped at the transition to the side wall. Such clamping may at the same time serve as a hinge and thus as a swivel axis for the flap portions of the end wall. Moreover, this embodiment is not only restricted to a ring-shaped gas bag and a cover closing a ring-shaped outlet opening, but the clamping principle is rather applicable to conventional module covers as well.

BRIEF DESCRIPTION OF THE DRAWINGS

FIGS. 3a to 3g show sectional views in the region of the central hole in the cover according to seven different embodiments, and FIG. 4 shows a top view of a module cover according to a further embodiment.

DETAILED DESCRIPTION OF THE PREFERRED EMBODIMENTS

Figure 1:
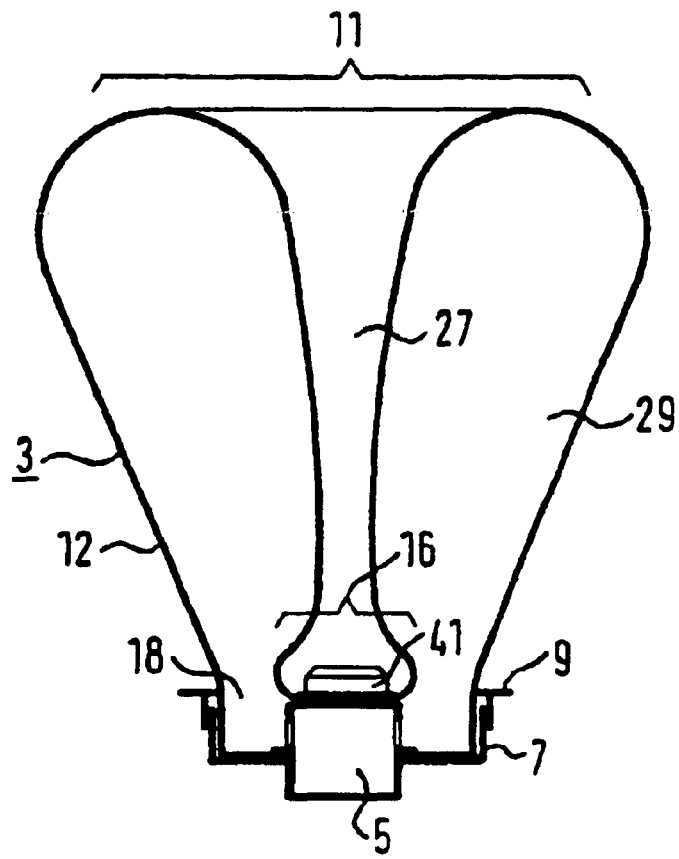
FIG. 1 shows a stylized sectional view of a gas bag restraining device according to the invention, with a deployed gas bag.

FIG. 1 shows a gas bag restraining device, comprising a gas bag module which has a gas bag 3, a gas generator 5 and a pot-shaped module housing 7 which is closed by a module cover 9. The gas bag has a wall with several portions, namely with a front wall 11 which is facing the occupant to be restrained and which the same can impact upon in the case of restraint, and with a rear wall 12. In the region of the front wall 11, a deep depression 27 is provided in the inflated condition, which depression is produced in that a center portion 16 of the front wall 11 is permanently attached to the module, to be more precise to the gas generator 5 and is thereby prevented from free movement out of the module when the gas bag 3 is inflated. The depression 27 (not to be filled by the gas of the gas generator 5) provides the gas bag with a ring-shaped chamber 29 to be filled with gas. In FIG. 1, there is also shown the ring-shaped outlet opening 18 of the module, through which the gas bag 3 emerges from the gas bag module. The depression 27 may also be closed towards the top, e.g. due to a suitable cut of the gas bag, when the gas bag is fully inflated.

Figure 2:
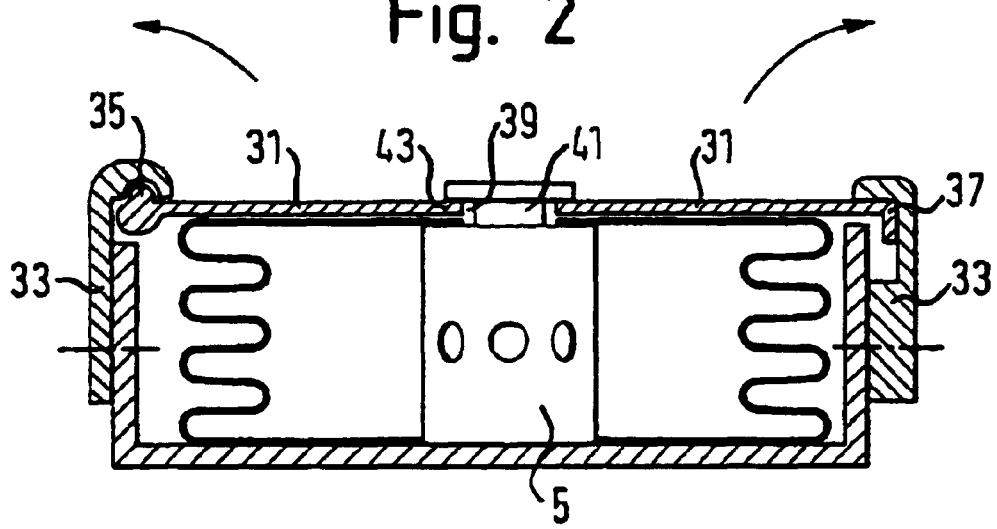
FIG. 2 shows a sectional view of the restraining device as shown in FIG. 1 with the cover not opened.

From FIG. 2 it can be taken that the module cover consists of a plurality of separate parts which are connected with each other, namely an end wall 31 and surrounding side walls 33. The side walls 33 reach around the lateral edges of the end wall 31, which in this area may have a thickened portion 35 (left-hand half of FIG. 2) or 37 (right-hand half of FIG. 2). Clamping the end wall 31 provides a kind of hinge with a swivel axis along the outer edge of the end wall 31. The end wall 31 either is made in one piece and has predetermined tear lines, so that flap portions are formed. Alternatively, the end wall 31 may also consist of a plurality of separate parts. The front wall may look like the front wall shown in FIG. 4 where the lines 55 may define the tear lines.

The module cover 9, more precisely the front wall 31, has a central hole 39, which is covered from the outside by a stationary cap 41 and cannot be seen. The edge 43 of the module cover 9 defining the hole 39 is connected with the cap 41 by a holding connection, to be more precise by a positive or form-fitting connection acting in swivel direction (see arrows), in that on its rear side the cap 41 has a surrounding groove at its outer edge, into which groove the edge 43 protrudes. Thus, the edge 43 cannot be grasped from the outside. The cap 41 is attached to the gas generator 5 such that it is not even detached from the gas generator 5 when the covering cap is opened. Usually, the center portion 16 is also clamped between the cap 41 and the upper end wall of the gas generator 5 and is thus fixed at the gas generator 5 for the case of restraint.

In the case of restraint itself, the gas generator 5 inflates the gas bag 3 and, as shown in FIG. 2, the latter urges the module cover 9 towards the top. Along predetermined, radially extending tear lines, the covering cap bursts starting from the edge 43 towards outside. The positive connection between the edge 43 and the cap 41 is released, and the flap portions being produced during bursting swivel towards outside in the direction of the arrow about the swivel axes, which extend parallel to the thickened portions 35, 37. The gas bag emerges radially towards outside at an angle and assumes the position shown in FIG. 1.

In FIGS. 3a to 3g various form-fitting connections between the cap 41 and the edge 43 are represented on an enlarged scale.

FIG. 3a shows the embodiment as shown in FIG. 2 in greater detail.

In the embodiments as shown in FIGS. 3b and 3c, a tongue-and-groove joint is provided as a positive connection, and in accordance with FIG. 3b a groove is provided at the outer periphery of the cap 41, into which groove the edge 43 protrudes.

As shown in FIG. 3c, the cap 41 has a projection 45 at the outer periphery, which projection protrudes into a groove in the edge 43.

FIG. 3d substantially corresponds to FIG. 3a, in which the edge 43 is, however, beveled to the top for better disengaging from the positive connection.

In FIG. 3e, the edge 43 extends upwards with a hook-shaped cross-section, engaging in the groove 47.

What is similar is the embodiment as shown in FIG. 3f, in which the edge 43 has a surrounding projection 49 extending to an underside of the cap 41, i.e. upwards, which projection urges against the underside of the cap 41. In this area, the cap has a complementary formed recess.

In FIG. 3g, the projection 51 constitutes a bead (undercut portion) semicircular in cross-section, which protrudes into a likewise complementary recess on the underside of the cap 41. With these designs an improved positive connection is achieved.

FIG. 4 represents an embodiment in which the module cover 9 consists of two opposing flap portions 52, 53, which in the region of a parting joint 55 are connected with each other by a tongue-and-groove joint 57, as can be seen in a section in the enlarged representation of the area framed with X. The two opposing flap portions 52, 53 swiveling towards outside are in sections positively attached to the cap 41, which bears an emblem "AB", and on the other hand are directly fixed in position to each other via the tongue-and-groove joint. In broken lines, the outer edges of the flap portions 52, 53 are represented, which form the swivel axes 58 of the flap portions 52, 53. When the module cover 9 is opened, the tongue-and-groove joint is torn open (without destruction of the module cover 9) or, generally opened, starting from the edge under the cap 51 and running outwards.

From the above description of the invention, those skilled in the art will perceive improvements, changes, and modifications in the invention. Such improvements, changes, and modifications within the skill of the art are intended to be encompassed by the appended claims.

What is claimed is:

1. A gas bag restraining device comprising:
    a gas bag module having a gas bag with a front wall for restraining an occupant, said front wall having a depression defined by a center portion of said front wall attached to said gas bag module, said center portion of said front wall being prevented from moving when said gas bag is inflated;
    a module cover for closing a ring-shaped outlet opening of said gas bag module, said module cover having a central hole covered by a stationary cap and an edge defining said central hole; and
    a holding connection provided between said edge and said stationary cap, said holding connection being released when said gas bag module is opened so that said module cover opens outwardly starting from said edge, said module cover having an end wall and a side wall, said end wall being clamped at a transition between said end wall and said side wall.

2. The gas bag restraining device as claimed in claim 1, wherein said holding connection is a form-fitting connection.

3. The gas bag restraining device as claimed in claim 2, wherein said cap makes a tongue-and-groove joint with said edge.

4. The gas bag restraining device as claimed in claim 1, wherein said edge is clamped between an underside of said cap and a part of said module to which said cap is attached.

5. The gas bag restraining device as claimed in claim 1, wherein said edge has a projection extending towards an underside of said cap, said edge resting against said underside of said cap.

6. The gas bag restraining device as claimed in claim 5, wherein, in a region of said projection, said underside has a recess for receiving said projection.

7. The gas bag restraining device as claimed in claim 1, wherein said module cover consists of opposing flap portions having a parting joint connecting said flap portions in a form-fitting manner.

8. The gas bag restraining device as claimed in claim 1, wherein said end wall has at least two opposing flap portions swivel outwardly said gas bag module opens, flap portions engaging in a form-fitting manner.

9. The gas bag restraining device as claimed in claim 8, wherein a hinge is formed at said transition, said hinge defining a swivel axis for said flap portions of said end wall.

10. The gas bag restraint device as claimed in claim 1, wherein said module cover is opened by tearing.

11. A gas bag restraining device comprising:
    a gas bag module having a gas bag with a front wall for restraining an occupant, said front wall having a depression defined by a center portion of said front wall attached to said gas bag module, said center portion of said front wall being prevented from moving when said gas bag is inflated;

a module cover for closing a ring-shaped outlet opening of said gas bag module, said module cover having a central hole covered by a stationary cap and an edge defining said central hole; and a holding connection provided between said edge and said stationary cap, said holding connection being released when said gas bag module is opened so that said module cover opens outwardly starting from said edge, said edge extending obliquely from an underside of said module cover toward an underside of said cap, said edge defining a chamfer extending along an outer perimeter of said cap.

12. A gas bag restraining device comprising:

a gas bag module having a gas bag with a front wall for restraining an occupant, said front wall having a depression defined by a center portion of said front wall attached to said gas bag module, said center portion of said front wall being prevented from moving when said gas bag is inflated;

a module cover for closing a ring-shaped outlet opening of said gas bag module, said module cover having a central hole covered by a stationary cap and an edge defining said central hole; and a holding connection provided between said edge and said stationary cap, said holding connection being released when said gas bag module is opened so that said module cover opens outwardly starting from said edge, said edge being clamped between an underside of said cap and a part of said gas bag module, said cap being immediately attached to said part.

13. The gas bag restraining device as claimed in claim 12, wherein said part is a gas generator.

14. A gas bag restraining device comprising:

a gas bag module having a gas bag with a front wall for restraining an occupant, said front wall having a depression defined by a center portion of said front wall attached to said gas bag module, said center portion of said front wall being prevented from moving when said gas bag is inflated;

a module cover for closing a ring-shaped outlet opening of said gas bag module, said module cover having a central hole covered by a stationary cap and a ring-shaped edge defining said central hole; and a holding connection provided between said ring-shaped edge and said stationary cap, said holding connection being released when said gas bag module is opened so that said module cover opens outwardly starting from said ring-shaped edge, said cap forming a tongue and groove joint with said ring-shaped edge, said joint extending around a perimeter of said cap.

15. A gas bag restraining device comprising:

a gas bag module having a gas bag with a front wall for restraining an occupant, said front wall having a depression defined by a center portion of said front wall attached to said gas bag module, said center portion of said front wall being prevented from moving when said gas bag is inflated;

a module cover for closing a ring-shaped outlet opening of said gas bag module, said module cover having a central hole covered by a stationary cap and an edge defining said central hole; and a holding connection provided between said edge and said stationary cap, said holding connection being released when said gas bag module is opened so that said module cover opens outwardly starting from said edge, said holding connection extending along said edge and around said cap, said edge having a projection extending toward an underside of said cap, said projection being disposed adjacent said underside of said cap, said underside of said cap having a ring-shaped recess for receiving said projection, said recess extending along a perimeter of said cap.

* * * * *

UNITED STATES PATENT AND TRADEMARK OFFICE
CERTIFICATE OF CORRECTION

PATENT NO. : 6,786,504 B2
DATED : September 7, 2004
INVENTOR(S) : Christian Lorenz, Udo Bieber and John-Oliver Derrick It is certified that error appears in the above-identified patent and that said Letters Patent is hereby corrected as shown below:

<u>Column 4,</u>
Line 58, after "outwardly" insert -- when --.

Signed and Sealed this

Twenty-ninth Day of March, 2005

JON W. DUDAS
*Director of the United States Patent and Trademark Office*